United States Patent
Wink et al.

(10) Patent No.: US 10,673,812 B2
(45) Date of Patent: Jun. 2, 2020

(54) SYSTEMS AND METHODS FOR RESOLVING DISTRIBUTED NETWORK ADDRESS CONFLICTS

(71) Applicant: MASTERCARD INTERNATIONAL INCORPORATED, Purchase, NY (US)

(72) Inventors: Brian Denning Wink, Wildwood, MO (US); Vishwam Shekhar Singh, Maharashtra (IN); Michael James Shaon, Columbia, MO (US)

(73) Assignee: Mastercard International Incorporated, Purchase, NY (US)

( * ) Notice: Subject to any disclaimer, the term of this patent is extended or adjusted under 35 U.S.C. 154(b) by 234 days.

(21) Appl. No.: 15/839,527

(22) Filed: Dec. 12, 2017

(65) Prior Publication Data

US 2019/0182209 A1 Jun. 13, 2019

(51) Int. Cl.
  *H04L 29/12* (2006.01)
  *H04L 12/741* (2013.01)
  *H04L 12/751* (2013.01)

(52) U.S. Cl.
  CPC .......... *H04L 61/2535* (2013.01); *H04L 45/02* (2013.01); *H04L 45/54* (2013.01); *H04L 61/2046* (2013.01); *H04L 61/2007* (2013.01)

(58) Field of Classification Search
  CPC ............. H04L 61/2535; H04L 61/2046; H04L 61/2007; H04L 45/54; H04L 45/02
  See application file for complete search history.

(56) References Cited

U.S. PATENT DOCUMENTS

| | | | |
|---|---|---|---|
| 6,249,523 B1 | 6/2001 | Hrastar et al. | |
| 7,127,524 B1 | 10/2006 | Renda et al. | |
| 7,395,354 B2 | 7/2008 | Keane et al. | |
| 9,537,819 B2 | 1/2017 | Gossain et al. | |
| 9,571,450 B2 | 2/2017 | Raju et al. | |
| 9,742,728 B2 | 8/2017 | Asveren | |
| 10,171,357 B2* | 1/2019 | Chander | H04L 45/745 |
| 2015/0127853 A1* | 5/2015 | Roskind | H04L 61/2503 709/245 |
| 2016/0080317 A1* | 3/2016 | Brandwine | H04L 67/2823 709/245 |
| 2017/0289101 A1* | 10/2017 | Farag | H04L 61/2046 |
| 2018/0309669 A1* | 10/2018 | Anderson | H04L 12/4633 |

* cited by examiner

*Primary Examiner* — Moustafa M Meky
*Assistant Examiner* — Kidest Mendaye
(74) *Attorney, Agent, or Firm* — Armstrong Teasdale LLP

(57) ABSTRACT

A network translation (NT) computing device generates a routing table for a global network including a plurality of local networks. Each local network is associated with a local network identifier of the routing table and includes at least one network-addressable (NA) computing device. The NT computing device stores the routing table in a routing database and receives a data packet having a recipient address from a first local network. The recipient address includes a local network identifier associated with a second local network and an internet protocol (IP) address for a recipient NA computing device within the second local network. The NT computing device extracts the local network identifier from the recipient address, compares the local network identifier to the routing table, and transmits the data packet with the IP address to the second local network to be transmitted to the recipient NA computing device based on the comparison.

19 Claims, 7 Drawing Sheets

SYSTEMS AND METHODS FOR RESOLVING DISTRIBUTED NETWORK ADDRESS CONFLICTS

BACKGROUND

The field of the present disclosure relates generally to network communications, and more specifically, resolving address conflicts between local networks for data transmission in a distributed network environment.

Data communication networks facilitate data transmission between various computing devices. The data communication networks may include public networks (e.g., the internet) and private networks (e.g., company networks and personal networks). Each computing device connected to a network is assigned an address to enable other devices within the network to identify and communicate with the computing device. The address may include, for example, an internet protocol (IP) address. In at least some known systems, IP addresses are assigned to computing devices within a network irrespective of the addresses assigned in other networks such that at least some IP addresses in two networks may overlap.

In some embodiments, several data communication networks may be merged together to form a global network. For example, a business may have different networks for different locations of the business. Merging the different networks into a global network enables computing devices between the two networks to communicate. However, the merged networks may include computing devices having overlapping IP addresses, otherwise known as an address conflict. When transmitting data packets to computing devices having an address conflict, the data packet may be delivered to the incorrect recipient, the data packet may be corrupted during transmittal, and/or the data packet may not be transmitted at all. In some embodiments, to resolve any address conflicts between networks, IP addresses may be reassigned across the global network such that each device within the network has a unique address. However, network devices, scripts, applications, and processes that rely upon the addresses to transmit and receive data may not be configured to automatically update to use the addresses from the reassignment. For example, a script may include a static or hard-coded IP address for a particular computing device within its instructions. To update the script, a user must manually update the script with the new address of the computing device. This process may be time-consuming and affect the performance of a service associated with the software being updated, especially if hundreds or even thousands of network devices, scripts, applications, processes, and the like may need to be checked and adjusted based on the reassigned addresses.

BRIEF DESCRIPTION

In one aspect, a network translation (NT) computing device includes at least one processor and a memory in communication with the at least one processor. The processor is programmed to generate a routing table for a global network communicatively coupled to the processor. The global network includes a plurality of local networks that include a first local network and a second local network. Each local network is associated with a local network identifier of the routing table and includes at least one network-addressable (NA) computing device. The processor is further programmed to store the routing table in a routing database and receive a data packet having a recipient address from the first local network. The recipient address includes a local network identifier associated with the second local network and an internet protocol (IP) address for a recipient NA computing device within the second local network. The processor is further programmed to extract the local network identifier from the recipient address, compare the local network identifier to the routing table to determine that the second local network is associated with the recipient NA computing device, and transmit the data packet with the IP address to the second local network based on the comparison. The data packet is transmitted to the recipient NA computing device within the second local network based on the IP address.

In another aspect, a method for transmitting a data packet between local networks of a global network communicatively coupled to an NT computing device is provided. The method is at least partially performed by the NT computing device. The global network includes a plurality of local networks that include a first local network and a second local network. Each local network is associated with a local network identifier and includes at least one NA computing device. The method includes generating a routing table including the local network identifiers associated with the plurality of local networks for the global network, storing the routing table in a routing database, and receiving a data packet having a recipient address from the first local network. The recipient address includes a local network identifier associated with the second local network and an IP address for a recipient NA computing device within the second local network. The method further includes extracting the local network identifier from the recipient address, comparing the local network identifier to the routing table to determine that the second local network is associated with the recipient NA computing device, and transmitting the data packet with the IP address to the second local network based on the comparison. The data packet is transmitted to the recipient NA computing device within the second local network based on the IP address.

In yet another aspect, at least one non-transitory computer-readable storage media having computer-executable instructions embodied thereon is provided. When executed by at least one processor, the computer-executable instructions cause the processor to generate a routing table for a global network communicatively coupled to the processor. The global network includes a plurality of local networks that include a first local network and a second local network. Each local network is associated with a local network identifier of the routing table and includes at least one NA computing device. The computer-executable instructions further cause the processor to store the routing table in a routing database and receive a data packet having a recipient address from the first local network. The recipient address includes a local network identifier associated with the second local network and an IP address for a recipient NA computing device within the second local network. The computer-executable instructions further cause the processor to extract the local network identifier from the recipient address, compare the local network identifier to the routing table to determine that the second local network is associated with the recipient NA computing device, and transmit the data packet with the IP address to the second local network based on the comparison. The data packet is transmitted to the recipient NA computing device within the second local network based on the IP address.

BRIEF DESCRIPTION OF THE DRAWINGS

FIG. 1 is a diagram illustrating an example network translation (NT) system for routing data between local networks of a global network in accordance with one embodiment of the disclosure.

FIG. 2 is a block diagram of an example NT system for routing data within the global network including a plurality of network devices and a plurality of network-addressable (NA) computing devices.

FIG. 3 is an example data schematic of the system shown in FIG. 2.

FIG. 4 is an expanded block diagram of an example embodiment of a remote device for use in the system shown in FIG. 1.

FIG. 5 illustrates an example configuration of a host system for use in the system shown in FIG. 1.

FIG. 6 is a flowchart of an example process for routing data between local networks using the system shown in FIG. 1.

FIG. 7 is a diagram of components of one or more example computing devices that may be used in embodiments of the described systems and methods.

DETAILED DESCRIPTION

Figure 1:
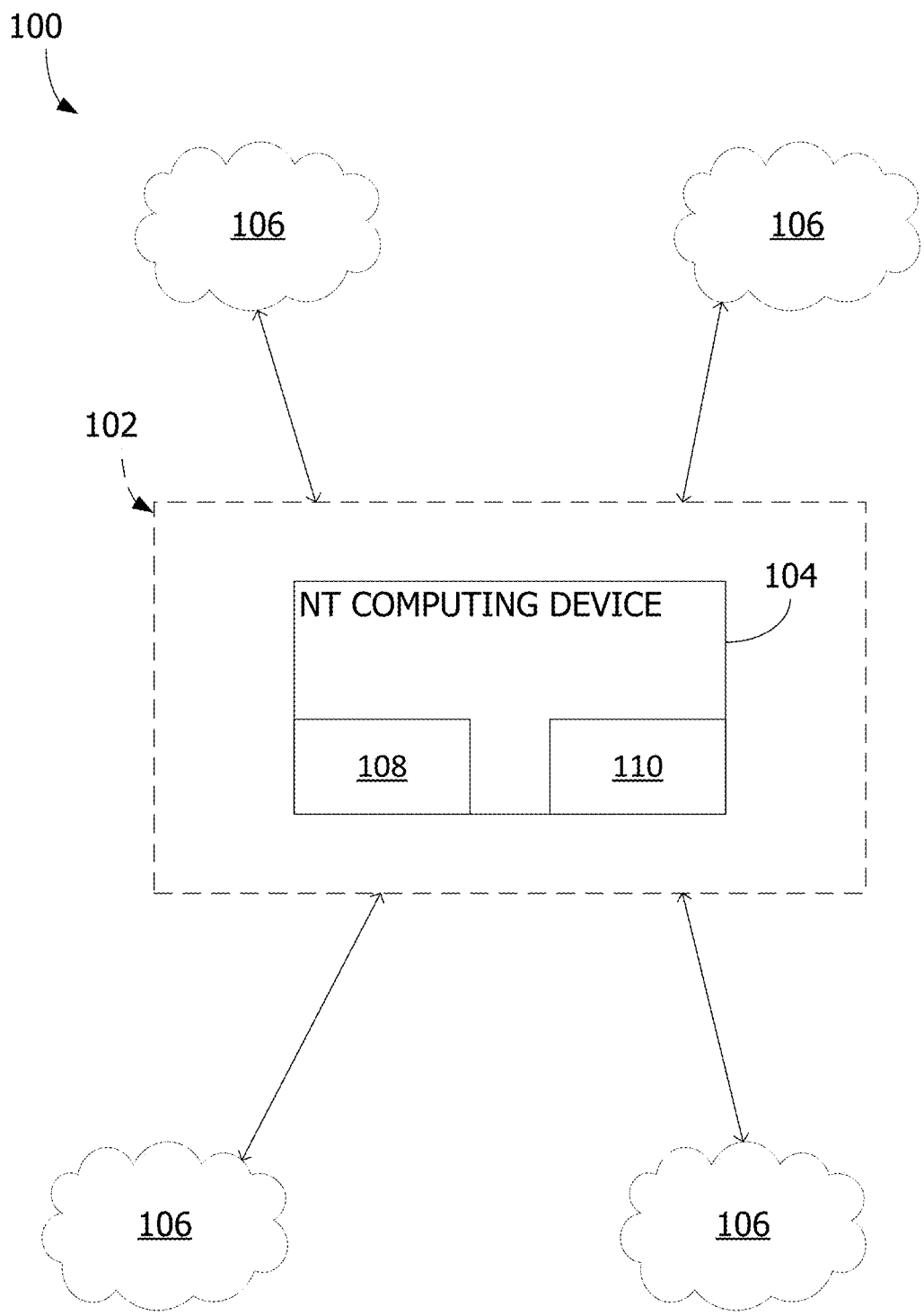
FIGS. 1-7 show example embodiments of the methods and systems described herein.

Systems and method according to this disclosure are directed to network communications, and more specifically, resolving address conflicts between local networks for data transmission in a distributed network environment.

A network translation (NT) system is described herein for routing data packets between a plurality of local networks within a global network. As used herein, a local network is a data communication network having a respective set of assignable network addresses to facilitate data communication. Each local network includes one or more network devices and at least one network-addressable (NA) computing device. The network devices are configured to facilitate data communication by receiving, transmitting, and routing data within the network according to one or more data communication protocols, such as Transmission Control Protocol/Internet Protocol (TCP/IP). The network devices may include, for example, network switches, modems, routers, network hubs, network bridges, network gateways, and the like. The NA computing devices are computing devices (e.g., a laptop, a desktop, a smartphone, a server, etc.) in communication with the network devices to receive and transmit data within the network. The NA computing devices may be communicatively coupled to the network devices using any suitable wireless or wired communication methods. Each NA computing device is assigned a network address (e.g., an internet protocol (IP) address) to enable the network devices to determine a sender and/or a recipient of data within the network. In at least some embodiments, at least some network devices may also be NA computing devices such that the network devices may be assigned a network address as well.

The global network is a plurality of local networks communicatively coupled to each other to enable NA computing devices within one local network to communicate with NA computing devices within another local network. In certain embodiments, the global network may be a subset of a larger network, such as the internet. In the example embodiment, the global network includes one or more network devices to facilitate communication between local networks. That is, the local networks do not communicate directly with each other, but rather communicate with other local networks through the network devices of the global network. Keeping the local networks separate from each other enables the global network to resolve address conflicts without affecting data communication internal to a local network. In other embodiments, the local networks communicate directly with each other (i.e., network devices of the communicating local networks establish communication and transmit data to each other). In such embodiments, a computing device associated with the global network may assist the local networks in identifying a recipient of data and routing the data to the recipient.

In the example embodiment, the NT system includes an NT computing device associated with the global network for resolving address conflicts between local networks. The NT computing device includes at least one processor and a memory in communication with the processor to store computer-readable instructions. When executed by the processor, the instructions cause the NT computing device to monitor and route data traffic between local networks as described herein. In some embodiments, the NT computing device is communicatively coupled to one or more network devices of the global network. In other embodiments, the NT computing device is configured to function as a network device. In one example, the NT computing device includes a communication interface that is configured to route data between local networks as described herein. Alternatively, the NT computing device is configured to monitor communications between local networks and provide instructions to the local networks.

In the example embodiment, the NT computing device is communicatively coupled to each local network using a different communication network or a different communication channel. In other embodiments, data received from each local network includes metadata identifying the local network. In the example embodiment, the NT computing device is configured to detect each local network within the global network. In one example, the NT computing device automatically detects the number of local networks. In another example, the NT computing device detects the local networks based on user input received from a user. The NT computing device is configured to assign a unique local network identifier to each local network. Each local network may be assigned one or more local network identifiers. For example, a local network may be assigned two identifiers if the local network includes two network devices communicatively coupled to the NT computing device. In the example embodiment, the NT computing device is configured to generate a routing table using the local network identifiers. The routing table is used during subsequent data transmissions to route data to its intended recipient within the global network as described herein. The routing table enables the NT computing device to transmit data to the correct local network for routing to the recipient without mapping or storing information regarding each NA computing device within the global network. In at least some embodiments, the routing table is stored in a routing database communicatively coupled to the NT computing device. In other embodiments, the routing table is stored in the memory of the NT computing device.

The NT computing device and/or the routing database are configured to provide the NA computing devices and the network devices within the local networks access to the routing table. The NA computing devices and/or the network devices are configured to transmit data based on the routing table as described herein to avoid address conflicts without requiring reassignment of network addresses within each local network. In one example, the NA computing devices and/or the network devices perform a lookup of the routing table to transmit data to another local network.

In the example embodiment, when an NA computing device generates a data packet to transmission, the NA computing device is configured to generate a recipient address associated with the data packet. The data packet includes a payload (i.e., the data intended for the recipient) and metadata, such as the address of the sender. The recipient address identifies the recipient of the data packet. The recipient may be within the same local network as the NA computing device generating the data packet (also referred to herein as a "sender device" or "sender computing device") or in a different local network. If the recipient is in the same local network as the sender device, the recipient address may be the IP address of the recipient. If the recipient is in a different local network, the recipient address includes a local network identifier to indicate which local network includes the recipient.

To transmit the data packet, the sender device transmits the data packet to one or more network devices within its local network. The network devices analyze the recipient address to determine where to route the data packet. If the recipient address does not include a local network identifier or includes the local network identifier associated with the sender device's local network, the network device routes the data packet to a recipient within the sender device's local network. If the recipient address includes a local network identifier for a different local network, the network device transmits the data packet with the recipient address to the NT computing device to translate the recipient address and route the data packet. In some embodiments, the recipient address may include a flag that indicates a local network identifier is included with the recipient address.

In certain embodiments, the sender device does not generate the local network identifier. In such embodiments, the sender device generates a different indicator or identifier associated with the recipient that the network device detects. The network device generates the local network identifier and updates the recipient address to include the local network identifier prior to transmittal to the NT computing device.

The NT computing device is configured to receive the data packet and extract the local network identifier from the recipient address. In the example embodiment, extracting the local network identifier from the recipient address removes the local network identifier the recipient address. In other embodiments, a copy of the local network identifier is retrieved from the recipient address. In such embodiments, the local network identifier may be removed prior to transmittal to the recipient.

The NT computing device is configured to compare the local network identifier to the local network identifiers of the routing table. In one example, the NT computing device performs a lookup of the routing table within the routing database for the extracted local network identifier. If a matching local network identifier is detected, the recipient is located within a local network associated with the matching local network identifier. The NT computing device then transmits the data packet to the local network associated with the recipient based on the comparison. In one embodiment, the NT computing device transmits the data packet to a network device within the local network to route the packet to the recipient. In another embodiment, the NT computing device transmits the data packet directly to the recipient.

In the example embodiment, the data packet is transmitted to the recipient's local host network without the local network identifier. In other embodiments, a network device of the recipients local host network removes the local network identifier before routing the data packet to the recipient. The data packet is received by the recipient and, in some embodiments, a notification is transmitted to the sender device and/or the NT computing device that the data packet was successfully received. In certain embodiments, if the data packet is unsuccessfully delivered, an error notification may be transmitted to the sender device and/or the NT computing device.

In some embodiments, the NT computing device may be configured to automatically detect new local networks. In one embodiment, the NT computing device detects communication with a network device that is not associated with any known local networks. The NT computing device is configured to assign a new local network identifier to the new local network and update the routing table to include the new local network identifier, thereby enabling other local networks to communicate with the new local network. In other embodiments, a user may provide user input to the NT computing device to add a new local network to the global network.

In one example of the NT system, a first NA computing device generates a data packet for a second NA computing device. The first NA computing device is within a first local network and the second NA computing device is in a second local network separate from the first local network. The first local network also includes a third NA computing device. The second and third NA computing devices have the same IP address. To address the second NA computing device, the first NA computing device performs a lookup within the routing table for a local network identifier associated with the second local network. The NA computing device generates a recipient address for the data packet that includes the IP address of the second NA computing device and the local network identifier of the second local network. The NA computing device then transmits the data packet with the recipient address to a first network device of the first local network.

The first network device is configured to determine the recipient of the data packet using the recipient address. More specifically, even though the third NA computing device has the same IP address as the second NA computing device, the first network device detects the local network identifier of the recipient address and determines the recipient is within a different local network. The network device then transmits or routes the data packet to the NT computing device to translate the local network identifier and route the data packet to the recipient (the second NA computing device).

The NT computing device receives the data packet and extracts the local network identifier from the recipient address. The extracted local network identifier is compared to the routing table to determine which local network includes the recipient of the data packet. In this example, the extracted local network identifier matches the local network identifier of the second local network. The NT computing device then routes the data packet to a second network device of the second local network. The second network device receives the data packet, analyzes the IP address of the recipient, and routes the data packet to the second NA computing device based on the analysis.

The methods and systems described herein may be implemented using computer programming or engineering techniques including computer software, firmware, hardware or any combination or subset thereof, wherein the technical effects may be achieved by performing one of the following steps: (i) receiving a data packet at a network device of a first local network within a global network; (ii) determining if a recipient of the data packet is within the first local network or a different local network; (iii) transmitting the data packet with a recipient address including a local network identifier to an NT computing device; (iv) extracting the local network identifier from the recipient address; (v) comparing the extracted local network identifier to a routing table storing local network identifiers for a plurality of local networks within the global network; (v) identifying a matching local network identifier based on the comparison that represents the local network including the recipient; (vi) transmitting the data packet to a network device associated with the local network of the recipient based on the matching local network identifier; and (vii) transmitting, using the network device, the data packet to the recipient based on an IP address indicated in the recipient address.

The systems and methods described herein are configured to facilitate (a) resolving address conflicts between merged networks without a global reassignment of network addresses and manually reconfigured processes, applications, and the like for the reassignment; (b) communication between NA computing devices in different local networks; (c) reduced memory burden on the NT computing device and/or the routing database by only storing local network identifiers and allowing the network devices of each local network to route data packets to NA computing devices; and (d) increased network and processing bandwidth for the NT system by removing the local network identifier from the recipient address.

Described herein are computer systems such as a host computing device, NA computing devices, and an NT computing device. As described herein, all such computer systems include at least one processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to route data packets in a distributed network system.

FIG. 1 is a diagram of an example NT system 102 for a global network 100. In the example embodiment, system 102 includes an NT computing device 104. Global network 100 includes a plurality of local networks 106 communicatively coupled to NT system 102. Although four local networks 106 are shown, it is to be understood that global network 100 may include any suitable number of local networks 106 to function as described herein. In other embodiments, global network 100 and/or system 102 include additional, fewer, or alternative components, including those described elsewhere herein.

NT computing device 104 includes at least one processor 108 and a memory 110 in communication with processor 108. Although NT computing device 104 is shown as a single computing device, NT computing device 104 may be a plurality of computing devices communicatively coupled together that operate together to perform the functions as described herein (i.e., a distributed computing system). NT computing device 104 is configured to facilitate routing of traffic between local networks 106. Local networks 106 are data communication networks that include a respective set of assignable network addresses for computing devices and network devices within a respective local network 106. Each local network 106 includes one or more network devices (not shown in FIG. 1) that route data between the connected devices and devices in other local networks. In one example, each local network 106 is associated with a geographical location, such as different locations of a business. In another example, each local network 106 is associated with different functionality within global network 100.

In the example embodiment, local networks 106 are communicatively coupled to each other through system 102. That is, data from one local network 106 is transmitted to system 102, which then transmits the data to the recipient local network 106. Local networks 106 are separate from each other except for through system 102. In other embodiments, local networks 106 communicate directly with each other. In such embodiments, system 102 is configured to monitor and direct communication between local networks 106.

In the example embodiment, NT computing device 104 is configured to receive data packets from local networks 106 that are directed to devices within other local networks 106. The data packet includes a recipient address that enables devices within global network 100 (including NT computing device 104) to identify a recipient of the data packet. In the example embodiment, the recipient address includes, but is not limited to, an IP address for the recipient within its respective local network 106 and a local network identifier. NT computing device 104 is configured to analyze the local network identifier to identify the recipient's local host network 106 as described herein. The data packet is transmitted to the identified local network 106 to be routed to the recipient of the data packet. In at least some embodiments, the local network identifier is extracted and removed from the recipient address such that applications, software, and the like installed on the recipient do not need to be configured to account for the local network identifier. Accordingly, data packets from other local networks 106 are treated the same by the recipient as data packets transmitted internally within the recipient's local network 106.

Figure 2:
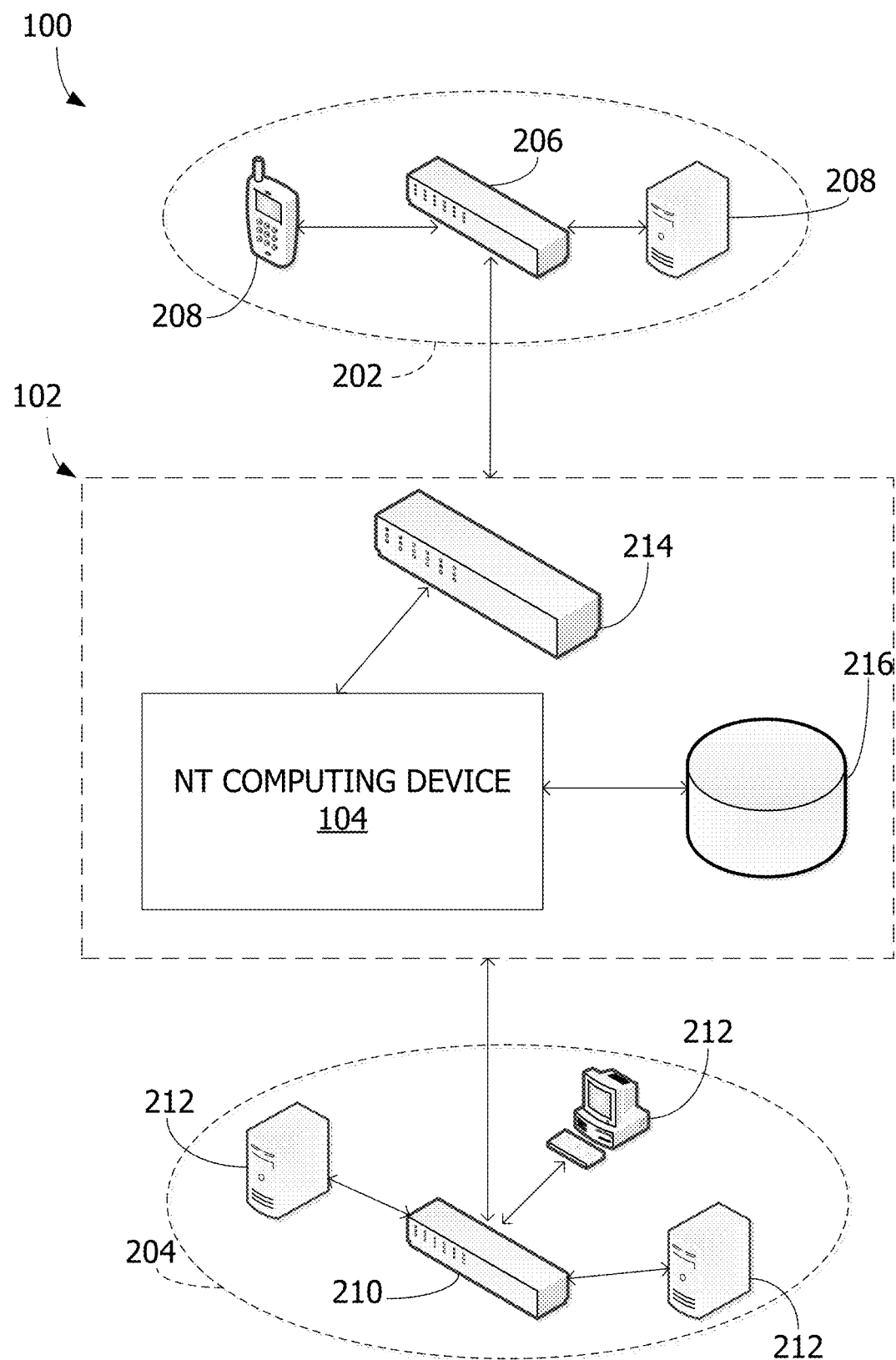

FIG. 2 is an example diagram of global network 100 including NT system 102 (shown in FIG. 1), a first local network 202 and a second local network 204. With respect to FIGS. 1 and 2, in the example embodiment, first local network 202 includes a first network device 206 and a plurality of NA computing devices 208 communicatively coupled to first network device 206. Second local network 204 includes a second network device 210 and a plurality of NA computing devices 212 communicatively coupled to second network device 210.

Network devices 206, 210 are devices configured to transmit, receive, and/or route data communications from one computing device to another. Network devices 206, 210 include, for example, network switches, modems, routers, network hubs, network bridges, network gateways, and combinations thereof. In one example, first network device 206 includes a plurality of network devices that operate together to facilitate data communication in first local network 202. Network devices 206, 210 are communicatively coupled to NT system 102 to transmit and receive data from other local networks 106 via NT system 102. Network devices 206, 210 are configured to route and communicate data using specific communication protocols, such as TCP/IP. At least some network devices 206, 210 include processors and memory devices (not shown) to monitor data traffic, communicate with other devices, and/or to generate additional data that may be added to data packets for transmission or transmitted separately.

First network device 206 is in data communication with NA computing devices 208. Similarly, second network device 210 is in data communication with NA computing devices 212. NA computing devices 208, 212 are computing devices that access global network 100 to transmit data to and receive data from other NA computing devices 208, 212 and other computing devices in communication with global network 100. NA computing devices 208, 212 may be any suitable computing devices configured to communicatively couple to network devices 206, 210. For example, and without limitation, NA computing devices 208, 212 may include smartphones, desktop computers, laptops, tablets, wearable electronics, personal digital assistants (PDAs), host computing devices, and combinations thereof. Each NA computing device 208, 212 is assigned a unique network address within the respective local network 202, 204 to facilitate identification of the correct NA computing device 208, 212 during data communication. In particular, a unique IP address is assigned to each NA computing device 208, 212. The unique network address is assigned by the respective network device 206, 210. For example, if a new NA computing device 208 is connected to first local network 202, first network device 206 generates a unique network address for the new NA computing device 208 by determining which network addresses have been previously assigned. In some embodiments, the network addresses may be dynamically reassigned to NA computing devices 208 over time. Although each NA computing device 208 is assigned a unique network address relative to other devices within first local network 202, the same network address may be assigned to other devices within other local networks 106. For example, a different NA computing device 212 within second local network 204 may have the same network address. NT system 102 is configured to resolve such address conflicts without requiring a global reassignment of network addresses.

In the example embodiment, NT system 102 includes NT computing device 104, a global network device 214, and a routing database 216. Global network device 214 is similar to network devices 206, 210 and is configured to route data traffic between local networks 106. In at least some embodiments, global network device 214 includes a plurality of network devices configured to route data traffic within global network 100. In the example embodiment, NT computing device 104 is communicatively coupled to global network device 214 to monitor network addresses of data packets and to facilitate routing the data packets to the intended recipients. In other embodiments, NT computing device 104 is integrally formed with global network device 214.

Routing database 216 is communicatively coupled to NT computing device 104 and is configured to store routing data for global network. The routing data is used to identify which local network 106 includes the intended recipient of a particular data packet. In the example embodiment, routing data is stored in a routing table (not shown in FIG. 2) for use by NT computing device 104. The routing table includes routing data for each local network 106 within global network 100. NT computing device 104 may be configured to assign routing data to local networks 106. In one example, NT computing device 104 is configured to detect a new local network 106 connected to global network 100. NT computing device 104 generates unique routing data associated with the new local network 106 and stores the routing data in routing database 216. In another example, a user provides user input to NT computing device 104 to configure global network 100 to include the new local network 106 and to generate the unique routing data.

In at least some embodiments, the routing data includes a local network identifier (not shown in FIG. 2). The local network identifier is unique for each local network 106. To transmit data packets outside of a particular local network 106, the local network identifier is added to the IP address of the recipient as part of the recipient address. The local network identifier prevents network devices 206, 210 from experiencing issues related to address conflict between local networks 202, 204 because IP addresses are unique within a particular local network and the local network identifier uniquely identifies a single local network such that a recipient address including an IP address and a local network identifier is unique within global network 100.

In certain embodiments, the routing data stored in routing database 216 is accessible by network devices 206, 210 and/or NA computing devices 208, 212. That is, the routing data is accessed by local networks 202, 204 to add the routing data to the recipient address of a data packet, thereby enabling NT computing device to route the data packet to the recipient's local network 106. In some embodiments, routing database 216 is accessible through NT computing device 104 (e.g., a web interface associated with NT computing device 104). In other embodiments, routing database 216 is configured to facilitate direct access to the routing data.

Figure 3:
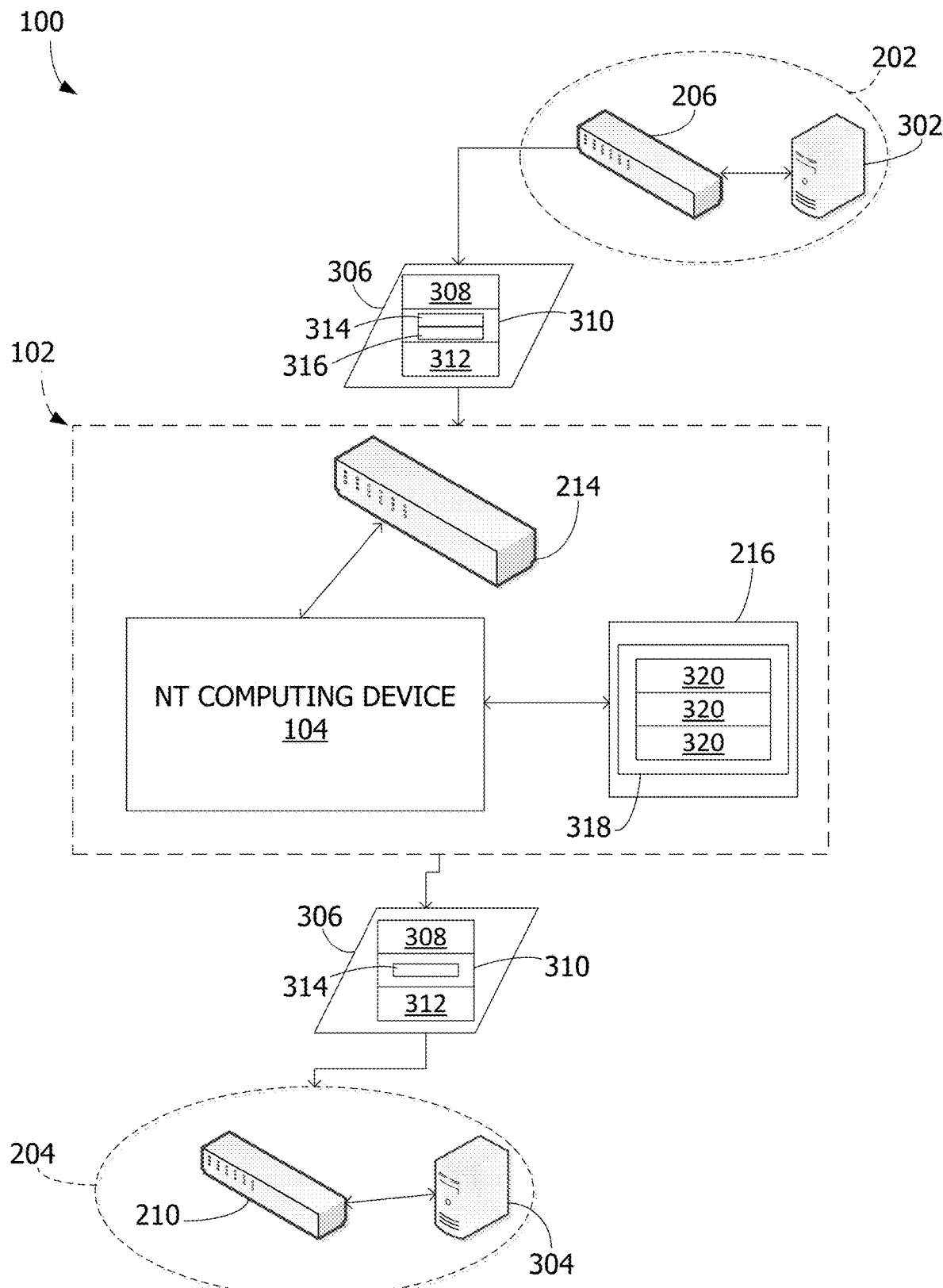

FIG. 3 is an example data flow diagram of global network 100 and system 102 (shown in FIG. 1) during transmittal of a data packet between local networks. In particular, FIG. 3 is an example data flow diagram for transmitting a data packet from a first NA computing device 302 within first local network 202 to a second NA computing device 304 within second local network 204. In other embodiments, additional, fewer, or alternative data may be generated and/or transmitted within network 100 and system 102 to facilitate the functionality described herein.

With respect to FIGS. 1-3, in the example embodiment, first NA computing device 302 is configured to generate a data packet 306 for transmission to second NA computing device 304. Data packet 306 includes a data payload 308, a recipient address 310, and a sender address 312. Data payload 308 is the data to be delivered to second NA computing device for storage, analysis, control, and/or other suitable computer-executable functions. Recipient address 310 enables the devices routing data packet 306 to second NA computing device 304 to identify the intended recipient of data packet, and thus transmit data packet 306 only to its intended recipient. In some embodiments, data packet 306 may include a plurality of recipient addresses for different computing devices. Sender address 312 identifies first NA computing device 302 as the sender device of data packet 306. In at least some embodiments, sender address 312 may be used to facilitate a response to data packet 306. For example, upon receiving data packet 306, second NA computing device 304 may be configured to generate a data packet and transmit the data packet back to first NA computing device 302. In such an example, second NA computing device 304 may use sender address 312 of data packet 306 as the recipient address. In some embodiments, data packet 306 includes other metadata to facilitate transmitting, receiving, and analyzing data payload 308.

In the example embodiment, recipient address 310 includes an IP address 314 and a local network identifier 316. In at least some embodiments, recipient address may include additional data elements, such as subnet masks or port numbers. IP address 314 is the IP address assigned to second NA computing device 304 within second local network 204 by second network device 210. That is, when data packet 306 is received by second network device 210, second network device 210 identifies the recipient of data packet 306 (i.e., second NA computing device 304) based on IP address 314. IP address 314 may be an IP version 4 (IPv4) address, an IP version 6 (IPv6) address, or a different IP address.

Local network identifier 316 identifies the local network associated with the recipient of data packet 306. More specifically, each local network 106 has a unique local network identifier. In some embodiments, recipient address 310 is an IPv6 address that includes an IPv4 address 314 and local network identifier 316. In other embodiments, local network identifier 316 may be, for example, a port number. Alternatively, local network identifier 316 may any suitable identifier that NT computing device 104 and network devices 206, 210 can identify. In at least some embodiments, recipient address 310 may not include a local network identifier 316 if data packet 306 is to be transmitted to a recipient internal to the sender's local network 106. For example, if first NA computing device 302 transmits data packet 306 to another NA computing device 208 within first local network 202, recipient address 310 may not include local network identifier 316. Alternatively, recipient address 310 may include local network identifier 316 for first local network 202 for data traffic internal to first local network 202.

In the example embodiment, local network identifiers 316 for each local network 106 within global network 100 are stored in a routing table 318 within routing database 216. Routing table 318 stores a plurality of entries 320, each entry 320 is associated with a respective local network 106. In the example embodiment, each entry 320 includes a respective local network identifier 316 and a respective network address. In one embodiment, the network address is an address for a network device of the corresponding local network 106. For example, the network address for second local network 204 is the address of second network device 210. In another embodiment, the network address may be a different address associated with the corresponding local network 106.

Routing table 318 is accessible by NT computing device 104, network devices 206, 210, and/or NA computing devices 302, 304. That is, routing table 318 is accessed to determine which local network identifier 316 is associated with a particular local network 106 or which local network 106 is associated with a particular local network identifier 316.

In the example embodiment, NA computing device 302 is configured to access routing table 318 to generate recipient address 310 of data packet 306. NA computing device 302 may retrieve local network identifier 316 using other means, such as retrieving a network address with a local network identifier 316 from a received data packet. When first network device 206 receives data packet 306 from first NA computing device 302, first network device 206 analyzes recipient address 310. If recipient address 310 does not include local network identifier 316 or includes the local network identifier 316 associated with first local network 202, network device 206 determines the recipient is within first local network 202 and transmits data packet 306 to the recipient based upon IP address 314. If recipient address 310 does include local network identifier 316 for a different local network 106, network device 206 transmits data packet 306 to NT system 102 via global network device 214. Alternatively, first network device 206 may be configured to add local network identifier 316 to recipient address if network device 206 determines the recipient is in a different local network 106. In such embodiments, NA computing device 302 may be configured to provide a different indicator to first network device 206 to identify the recipient and prevent address conflict.

NT computing device 104 is configured to receive data packet 306 and extract local network identifier 316 from recipient address 310. In the example embodiment, local network identifier 316 is removed from recipient address 310 when extracted from recipient address 310. In some embodiments, local network identifier 316 may be removed at a different time, such as prior transmitting data packet 306 to its recipient or at a network device associated with the recipient (e.g., second network device 210). NT computing device 104 is configured to compare local network identifier to routing table 318. In particular, NT computing device 104 compares the extracted local network identifier 316 to entries 320 to identify an entry 320 with a matching local network identifier. If NT computing device 104 does not identify an entry 320 with a matching local network identifier, NT computing device 104 may send a notification or data packet 306 to first network device 206 to indicate local network identifier 316 is not associated with a local network 106 within global network 100. If a matching identifier is detected, NT computing device 104 is configured to route data packet 306 to the corresponding local network 106. In one example, if local network identifier 316 is associated with second local network 204, then NT computing device 104 transmits data packet 306 to second network device 210.

In the example embodiment, data packet 306 is modified to remove local network identifier 316 by NT computing device 104 to transmit to the recipient's local network 106. Removing local network identifier 316 prior to transmitting to the recipient's local network 106 may facilitate transmission of data packet 306 without substantive modifications to software installed on network devices 206, 210 or NA computing devices 208, 212. In one example, second network device 212 may not be configured to extract IP address 314 from recipient address 310, and thus removing local network identifier 316 may enable second network device to properly identify IP address 314 to route data packet 306. In other embodiments, NT computing device 104 transmits data packet 306 with local network identifier 316. In such embodiments, network devices 206, 210 may be configured to remove local network identifier 316 from data packet 306. In certain embodiments, NT computing device 104 may be configured to modify other metadata of data packet 306. In one example, NT computing device 104 may add a local network identifier 316 to sender address 312 to enable the recipient to transmit a response back to the sender device.

In the example embodiment, second network device 210 is configured to receive data packet 306 and analyze IP address 314 to identify the recipient (i.e., second NA computing device 304). Second network device 210 then routes or transmits data packet 306 to the recipient. In some embodiments, second NA computing device 304 may be configured to transmit a notification back to second network device 210 indicating data packet 306 was received.

Figure 4:
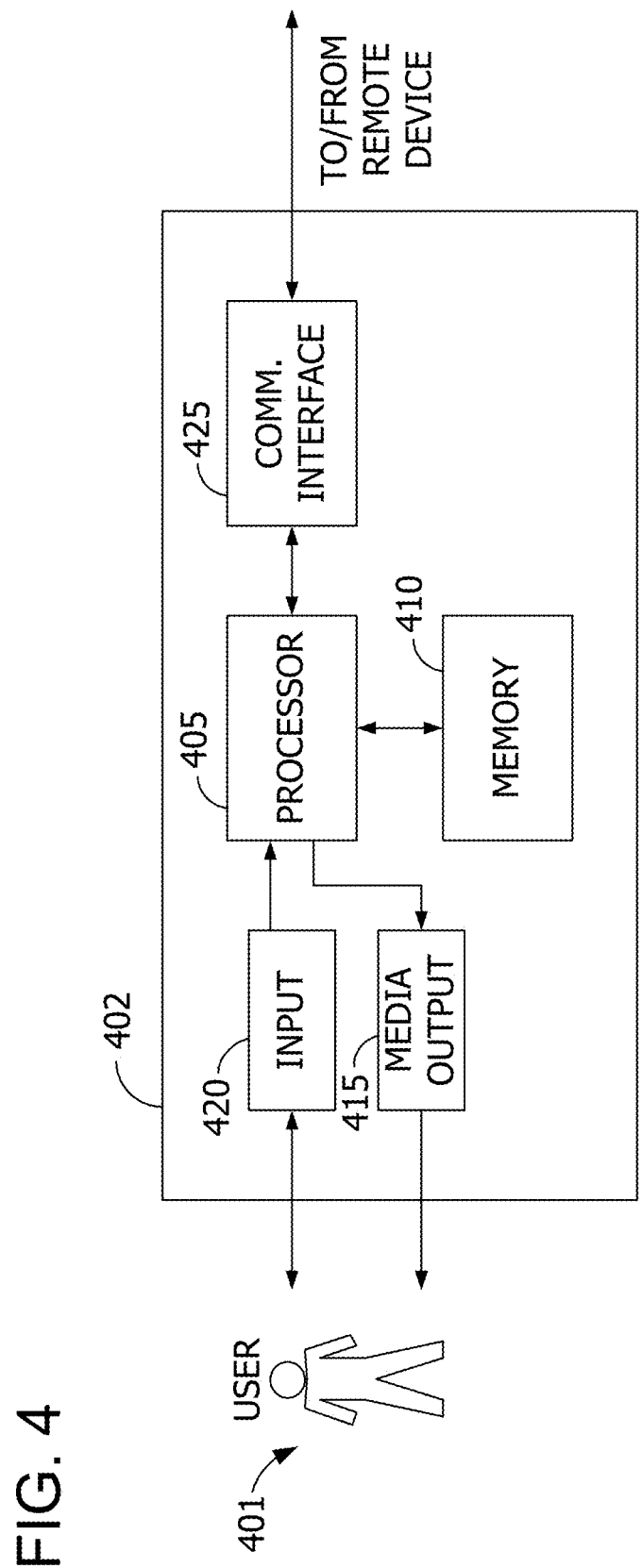

FIG. 4 depicts an exemplary configuration of a remote or user computing device 402, such as NA computing devices 208, 212 (shown in FIG. 2). Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 401. Media output component 415 may be any component capable of conveying information to user 401. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 401.

In some embodiments, computing device 402 may include an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website from a web server. A client application allows users 401 to interact with a server application associated with, for example, a vendor or business.

Figure 5:
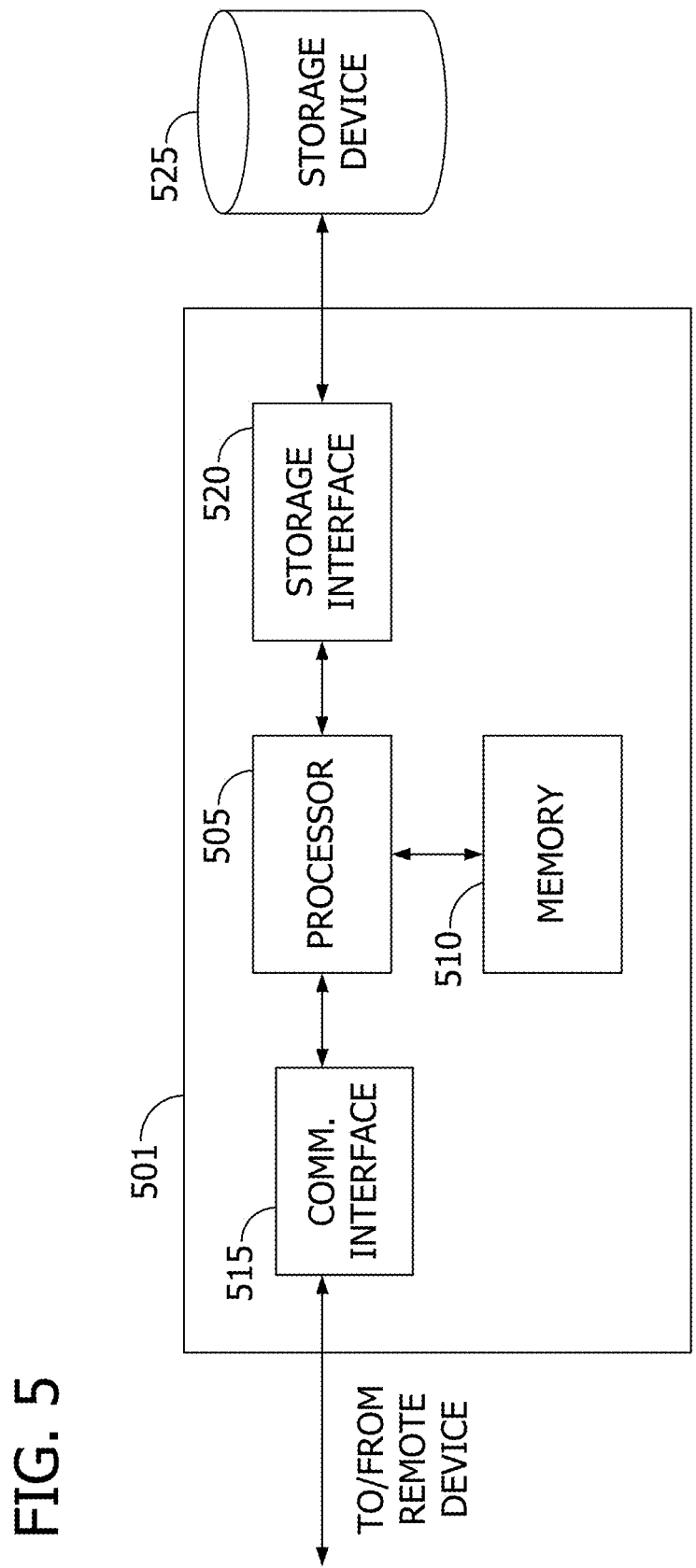

FIG. 5 depicts an exemplary configuration of a host computing device 502, such as NT computing device 104 (shown in FIG. 1), network devices 206, 210, and NA computing devices 208, 212 (shown in FIG. 2). Host computing device 502 may include a processor 505 for executing instructions. Instructions may be stored in a memory area 510, for example. Processor 505 may include one or more processing units (e.g., in a multi-core configuration).

Processor 505 may be operatively coupled to a communication interface 515 such that host computing device 502 may be capable of communicating with a remote device such as computing device 402 shown in FIG. 4 or another host computing device 502. For example, communication interface 515 may receive requests from user computing device 402 via a respective local network 106 or global network 100 (both shown in FIG. 1).

Processor 505 may also be operatively coupled to a storage device 525. Storage device 525 may be any computer-operated hardware suitable for storing and/or retrieving data. In some embodiments, storage device 525 may be integrated in host computing device 502. For example, host computing device 502 may include one or more hard disk drives as storage device 525. In other embodiments, storage device 525 may be external to host computing device 502 and may be accessed by a plurality of host computing devices 502. For example, storage device 525 may include multiple storage units such as hard disks or solid state disks in a redundant array of inexpensive disks (RAID) configuration. Storage device 525 may include a storage area network (SAN) and/or a network attached storage (NAS) system.

In some embodiments, processor 505 may be operatively coupled to storage device 525 via a storage interface 520. Storage interface 520 may be any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 525.

Memory areas 410 (shown in FIG. 4) and 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
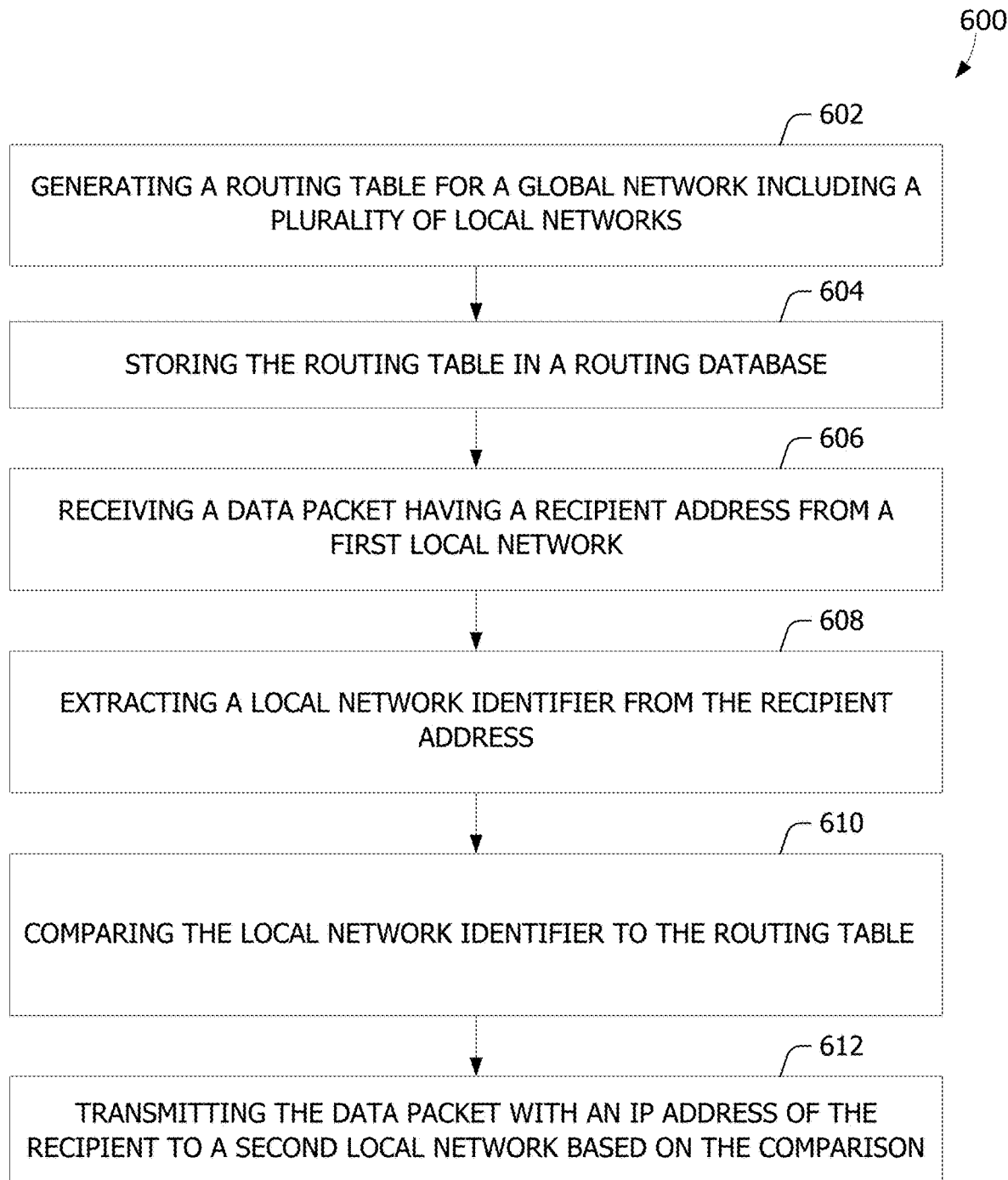

FIG. 6 is a flow diagram of an example method 600 for routing data packets transmitted between local networks of a global network. Method 600 is performed using an NT system, such as system 102 (shown in FIG. 1). In the example embodiment, method 600 is at least partially performed by an NT computing device. In other embodiments, method 600 includes additional, fewer, or alternative steps, including those described elsewhere herein.

To being method 600, the NT computing device generates 602 a routing table for the global network. The routing table includes at least one local network identifier for each local network within the global network. In some embodiments, the NT computing device automatically detects local networks within the global network and assigns a unique local network identifier to each detected local network. In other embodiments, the NT computing device receives user input from a user to generate the routing table. The NT computing device stores 604 the routing table in a routing database for subsequent retrieval. The routing table may be accessible by devices within the local networks (e.g., network devices, NA computing devices, etc.) to generate network addresses.

The NT computing device receives 606 a data packet having a recipient address from a first local network within the global network. The recipient address includes an IP address associated with an intended recipient of the data packet and a local network identifier to identify the recipient's local network. The NT computing device extracts 608 the local network identifier from the recipient address for analysis. In at least some embodiments, extracting 608 the local network identifier removes the local network identifier from the recipient address. The NT computing device compares 610 the extracted local network identifier to the routing table to identify a matching local network identifier storing in the routing table. The matching local network identifier is the local network identifier associated with the recipient's local network. In the example embodiment, the matching network identifier is associated with a second local network of the global network. The NT computing device then transmits 612 the data packet with the IP address from the recipient address to the second local network based on the comparison. In at least some embodiments, the data packet is transmitted 612 to a network device associated with the second local network. The network device then transmits the data packet to the recipient based on the IP address.

Figure 7:
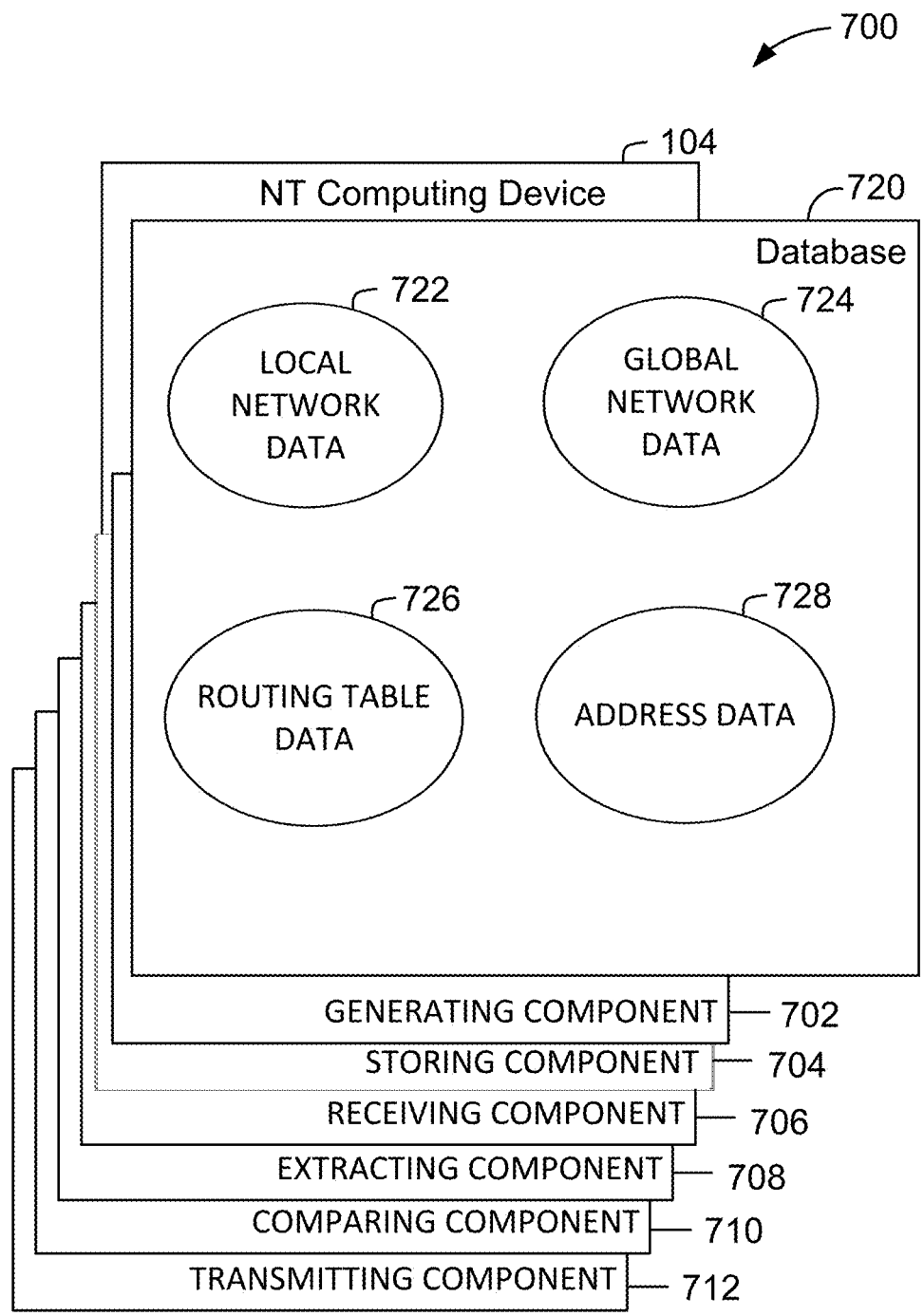

FIG. 7 is a diagram 700 of components of one or more example computing devices that may be used in the method shown in FIG. 6. FIG. 7 further shows a configuration of a database system 720 coupled to several separate components within NT computing device 104 (shown in FIG. 1), which perform specific tasks.

NT computing device 104 includes generating component 702 configured to generate a routing table for a global network. NT computing device 104 further includes a storing component 704 configured to store the routing table in a routing database. NT computing device 104 also includes a receiving component 706 configured to receive a data packet having a recipient address from a first local network. NT computing device 104 also includes an extracting component 708 configured to extract a local network identifier from the recipient address. NT computing device 104 further includes a comparing component 710 configured to compare the local network identifier to the routing table. NT computing device 104 also includes a transmitting component 712 configured to transmit the data packet with an IP address of the recipient to a second local network based on the comparison performed by comparing component 710.

In an exemplary embodiment database system 720 is divided into a plurality of sections, including but not limited to, a local network data section 722, a global network data section 724, a routing table data section 726, and an address data section 728. These sections are interconnected through NT computing device 104 to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A network translation (NT) computing device comprising at least one processor and a memory in communication with the at least one processor, wherein the at least one processor is programmed to:
    generate a routing table for a global network communicatively coupled to the at least one processor, the global network comprising a plurality of local networks including a first local network and a second local network, wherein the routing table associates, for each local network of the plurality of local networks, a local network identifier with a network device on the respective local network, the network device providing network connectivity between the NT computing device and at least one network-addressable (NA) computing device on the respective local network;
    store the routing table in a routing database;
    receive a data packet formatted according to a network communication protocol from the first local network, wherein the network communication protocol defines a recipient address field of the data packet, wherein the recipient address field of the data packet is populated with both (i) the respective local network identifier associated with the second local network and (ii) an internet protocol (IP) address assigned on the second local network for a recipient NA computing device within the second local network;
    extract the local network identifier from the recipient address field;
    compare the local network identifier to the routing table to identify the respective network device associated with the second local network; and
    transmit the data packet with the IP address to the respective network device associated with the second local network based on the comparison, wherein the data packet is transmitted to the recipient NA computing device within the second local network based on the IP address.

2. The NT computing device in accordance with claim 1, wherein each respective network device is configured to route data traffic between other local networks and the at least one NA computing device within the corresponding local network.

3. The NT computing device in accordance with claim 2, wherein the at least one processor is further programmed to receive the data packet from a first network device of the first local network, wherein the first network device routes the data packet to the at least one processor when the local network identifier in the recipient address field is detected.

4. The NT computing device in accordance with claim 1, wherein a first NA computing device of the first local network and a second NA computing device of the second local network are associated with the same IP address, wherein the first local network is associated with a local network identifier different from a local network identifier associated with the second local network.

5. The NT computing device in accordance with claim 1, wherein the at least one processor is further programmed to provide the NA computing devices of the plurality of local networks access to the routing table, wherein one of the NA computing devices generate the recipient address based on the routing table.

6. The NT computing device in accordance with claim 1, wherein the data packet includes a sender address associated with a sender NA computing device within the first local network, the sender address including a local network identifier associated with the first local network and an IP address associated with the sender NA computing device.

7. The NT computing device in accordance with claim 1, wherein the at least one processor is further programmed to:
    detect a new local network within the global network;
    generate a unique local network identifier associated with the new local network; and
    update the routing table to include the unique local network identifier to facilitate communication with the plurality of local networks.

8. A method for transmitting a data packet between local networks of a global network communicatively coupled to a network translation (NT) computing device, wherein the global network comprises a plurality of local networks including a first local network and a second local network, wherein each local network of the plurality of local networks is associated with a local network identifier, the method comprising:
    generating, by the NT computing device, a routing table for the global network, wherein the routing table associates, for each local network of the plurality of local networks, the local network identifier with a network device on the respective local network, the network device providing network connectivity between the NT computing device and at least one network-addressable (NA) computing device on the respective local network;
    storing the routing table in a routing database;
    receiving, by the NT computing device, a data packet formatted according to a network communication protocol from the first local network, wherein the network communication protocol defines a recipient address field of the data packet, wherein the recipient address field of the data packet is populated with both (i) the respective local network identifier associated with the second local network and (ii) an internet protocol (IP) address assigned on the second local network for a recipient NA computing device within the second local network;
    extracting the local network identifier from the recipient address field;
    comparing, by the NT computing device, the local network identifier to the routing table to identify the respective network device associated with the second local network; and
    transmitting, by the NT computing device, the data packet with the IP address to the respective network device associated with the second local network based on the comparison, wherein the data packet is transmitted to the recipient NA computing device within the second local network based on the IP address.

9. The method in accordance with claim 8, wherein each respective network device is configured to route data traffic between other local networks and the at least one NA computing device within the corresponding local network.

10. The method in accordance with claim 9, wherein receiving the data packet further comprises receiving the data packet from a first network device of the first local network, wherein the first network device routes the data packet to the NT computing device when the local network identifier in the recipient address field is detected.

11. The method in accordance with claim 8, wherein a first NA computing device of the first local network and a second NA computing device of the second local network are associated with the same IP address, wherein the first local network is associated with a local network identifier different from a local network identifier associated with the second local network.

12. The method in accordance with claim 8, wherein storing the routing table further comprises providing the NA computing devices of the plurality of local networks access to the routing table, wherein one of the NA computing devices generate the recipient address based on the routing table.

13. The method in accordance with claim 8, wherein the data packet includes a sender address associated with a sender NA computing device within the first local network, the sender address including a local network identifier associated with the first local network and an IP address associated with the sender NA computing device.

14. The method in accordance with claim 8 further comprising:
  detecting new local network within the global network;
  generating, by the NT computing device, a unique local network identifier associated with the new local network; and
  updating the routing table to include the unique local network identifier to facilitate communication with the plurality of local networks.

15. At least one non-transitory computer-readable storage media having computer-executable instructions embodied thereon, wherein when executed by at least one processor, the computer-executable instructions cause the at least one processor to:
  generate a routing table for a global network communicatively coupled to the at least one processor, the global network comprising a plurality of local networks including a first local network and a second local network, wherein the routing table associates, for each local network of the plurality of local networks, a local network identifier with a network device on the respective local network, the network device providing network connectivity between the NT computing device and at least one network-addressable (NA) computing device on the respective local network;
  store the routing table in a routing database;
  receive a data packet formatted according to a network communication protocol from the first local network, wherein the network communication protocol defines a recipient address field of the data packet, wherein the recipient address field of the data packet is populated with both (i) the respective local network identifier associated with the second local network and (ii) an internet protocol (IP) address assigned on the second local network for a recipient NA computing device within the second local network;
  extract the local network identifier from the recipient address field;
  compare the local network identifier to the routing table to identify the respective network device associated with the second local network; and
  transmit the data packet with the IP address to the respective network device associated with the second local network based on the comparison, wherein the data packet is transmitted to the recipient NA computing device within the second local network based on the IP address.

16. The computer-readable storage media in accordance with claim 15, wherein each respective network device is configured to route data traffic between other local networks and the at least one NA computing device within the corresponding local network.

17. The computer-readable storage media in accordance with claim 16, wherein the computer-executable instructions further cause the at least one processor to receive the data packet from a first network device of the first local network, wherein the first network device routes the data packet to the at least one processor when the local network identifier in the recipient address field is detected.

18. The computer-readable storage media in accordance with claim 15, wherein a first NA computing device of the first local network and a second NA computing device of the second local network are associated with the same IP address, wherein the first local network is associated with a local network identifier different from a local network identifier associated with the second local network.

19. The computer-readable storage media in accordance with claim 15, wherein the computer-executable instructions further cause the at least one processor to:
  detect new local network within the global network;
  generate a unique local network identifier associated with the new local network; and
  update the routing table to include the unique local network identifier to facilitate communication with the plurality of local networks.

* * * * *